July 20, 1926.
C. D. DERNIER
MOTOR VEHICLE DRIVE
Filed Nov. 27, 1922
1,592,970
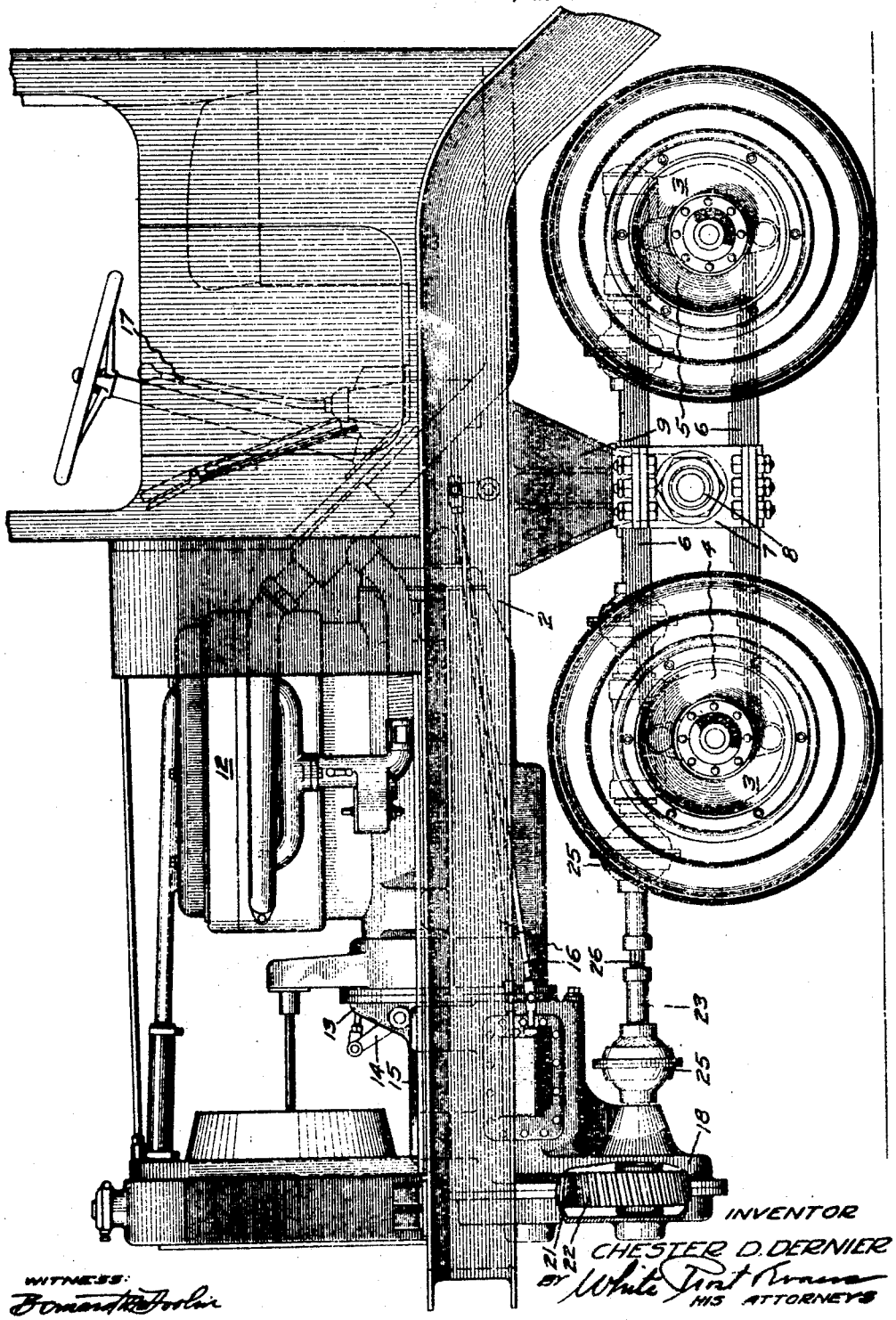

Patented July 20, 1926.

1,592,970

UNITED STATES PATENT OFFICE.

CHESTER D. DERNIER, OF SAN FRANCISCO, CALIFORNIA, ASSIGNOR OF THREE-FIFTHS TO EMORY WINSHIP, OF SAN FRANCISCO, CALIFORNIA.

MOTOR-VEHICLE DRIVE.

Application filed November 27, 1922. Serial No. 603,507.

The invention relates to a motor vehicle drive and particularly to a front wheel drive.

An object of the invention is to provide a simple and efficient front wheel drive.

Heretofore, front wheel drives have included a drive shaft extending backward from the engine or transmission gear housing to a power transmission device secured to the vehicle frame about midway of the length thereof and a drive shaft extending forward from the power transmission device, to the front axle. On account of the relative movement between the front axle and the vehicle frame, due to the interposition of springs between the axle and the frame, the forwardly extending drive shaft was necessarily quite long, to permit this relative movement without causing an excessive action on the universal joints arranged in such shaft. This construction thus required the employment of two relatively long drive shafts. In accordance with my invention, I employ only one drive shaft.

The invention possesses other advantageous features, some of which, with the foregoing, will be set forth at length in the following description, where I shall outline in full, that form of the invention which I have selected for illustration in the drawing accompanying and forming part of the present specification.

The drawing is an elevation, partly in section, of the forward portion of a motor driven vehicle equipped with the drive of my invention. In the drawings I have shown a vehicle having two front driving axles, but it is to be understood that the invention is equally applicable to vehicles having only one front driving axle.

The vehicle shown in the drawing comprises a suitable frame 2, which is supported at its forward end on wheels 3 mounted on the axle-housings 4—5. Interposed between the frame, at each side of the vehicle, and the axles, are two superposed leaf springs 6, connected together to function as a unit. The springs are clamped, at their centers, to a block 7, journalled on the transverse shaft 8 mounted on the brackets 9 secured to the vehicle frame. At their flexible ends, the springs are connected to the axle housings 4—5, in any suitable manner.

The vehicle is driven by an internal combustion engine 12 mounted on the frame at the forward end thereof. The clutch and speed reduction gear mechanism, instead of being arranged behind the engine, as is the universal practice, are arranged in front of the engine, so that the drive shaft extends from the forward end of the unit power plant. Disposed in front of the engine and secured thereto is the clutch housing 13 in which the clutch is disposed, the clutch being operated by the lever 14. Disposed in front of the clutch housing and secured thereto is the gear case 15 in which the variable speed transmission gears are arranged. These gears are shifted to produce the desired speed reduction by rods 16 operated by the usual gear shift lever 17. Secured to or formed integral with the gear case 15, and arranged at the forward end thereof, is a housing 18 in which transmission gears 21 and 22 are arranged. The gear 21 is secured to the driven shaft of the variable speed gear and meshes with the gear 22 which is secured to the propeller shaft 23. The housing 18 extends downward below the gear case and the propeller shaft 23 extends backward from the housing, under the engine, to the front axle. In the drawing I have shown two worm drive front axles 4—5. The propellor shaft, between the housing 18 and the axle 4 is provided with two universal joints 25 and a slip joint 26 and between the two axles, the propeller shaft is similarly provided with universals and a slip joint.

The present invention relates particularly to the driving gear and not to the mounting of the front axle or axles and their connection to the frame, so that no effort has been made to show radius rods, torque rods or other features of construction which may prove necessary or desirable in utilizing the drive of my invention with a vehicle having two front driving axles. By virtue of the construction of my invention, all of the drive mechanism is disposed in front of the front axle, so that the body of the vehicle may be made very low.

I claim:

1. A front wheel drive for vehicles comprising an engine mounted on the vehicle frame adjacent the front end thereof, a clutch housing and a variable speed transmission housing arranged in front of the engine, a housing depending from the front end of the transmission housing, a drive axle, springs interposed between the frame and the drive axle, a propeller shaft extending substantially horizontally forward from the drive axle into said latter housing and means in said latter housing connecting the propeller shaft with the driven shaft of the variable speed transmission.

2. A front wheel drive for vehicles comprising an engine mounted adjacent the front end of a vehicle frame, a clutch housing and a variable speed transmission housing arranged in front of the engine, a housing extending from the front end of the transmission housing, a drive axle, springs interposed between the frame and the drive axle to allow relative movement thereof, a propeller shaft extending substantially horizontally forward from the drive axle into said latter housing, means in said latter housing connecting the propeller shaft with the variable speed transmission, said propeller shaft being arranged to move at one end with the frame and at the other end with the drive axle.

3. A front wheel drive for vehicles comprising an engine mounted adjacent the front end of a vehicle frame, a clutch housing and a variable speed transmission housing arranged in axial alinement with and in front of said engine, a spur gear housing extending from the front end of the transmission housing, spur gears in said spur gear housing having their rotational axes substantially parallel to the axis of alinement of the engine, clutch housing and transmission housing, a drive axle disposed substantially directly below said engine and connected to said frame for relative movement therewith, and a substantially horizontal propeller shaft having one end connected to one of said spur gears and arranged to move with said frame, and having the other end connected to said drive axle and arranged to move therewith.

In testimony whereof, I have hereunto set my hand.

CHESTER D. DERNIER.